Feb. 28, 1928.
F. SHEPPARD
GARAGE DOOR OPENER
Filed April 1, 1927      3 Sheets-Sheet 1
1,660,768
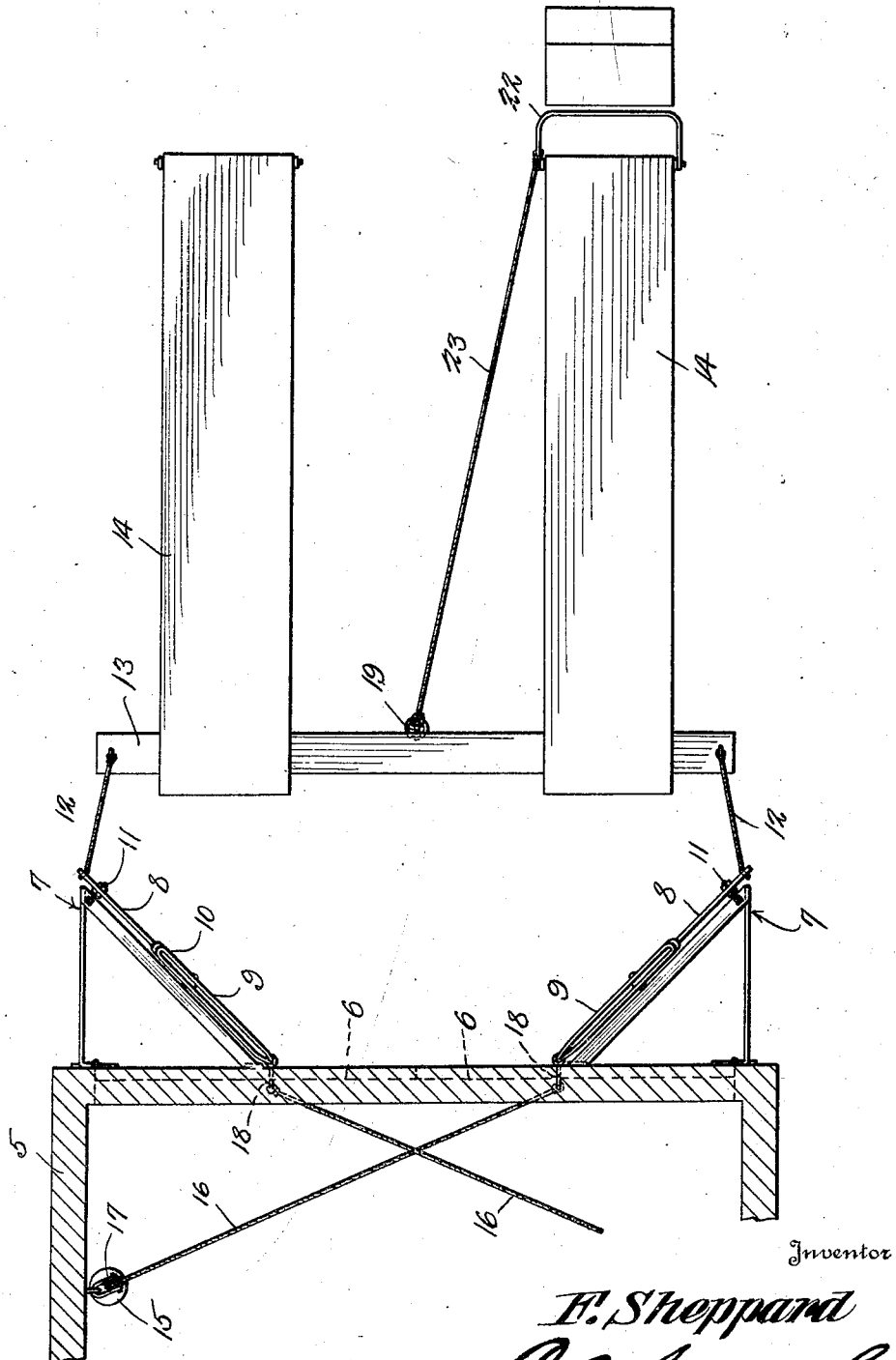

Feb. 28, 1928.
F. SHEPPARD
GARAGE DOOR OPENER
Filed April 1, 1927  3 Sheets-Sheet 2
1,660,768
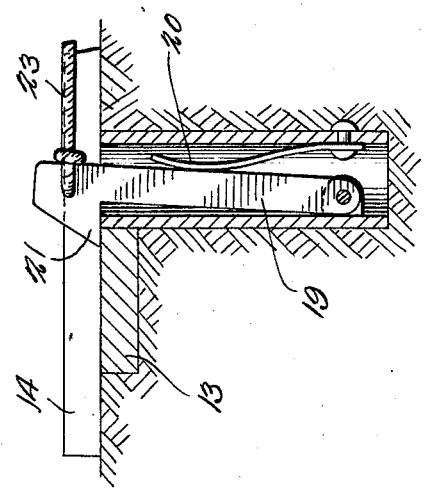
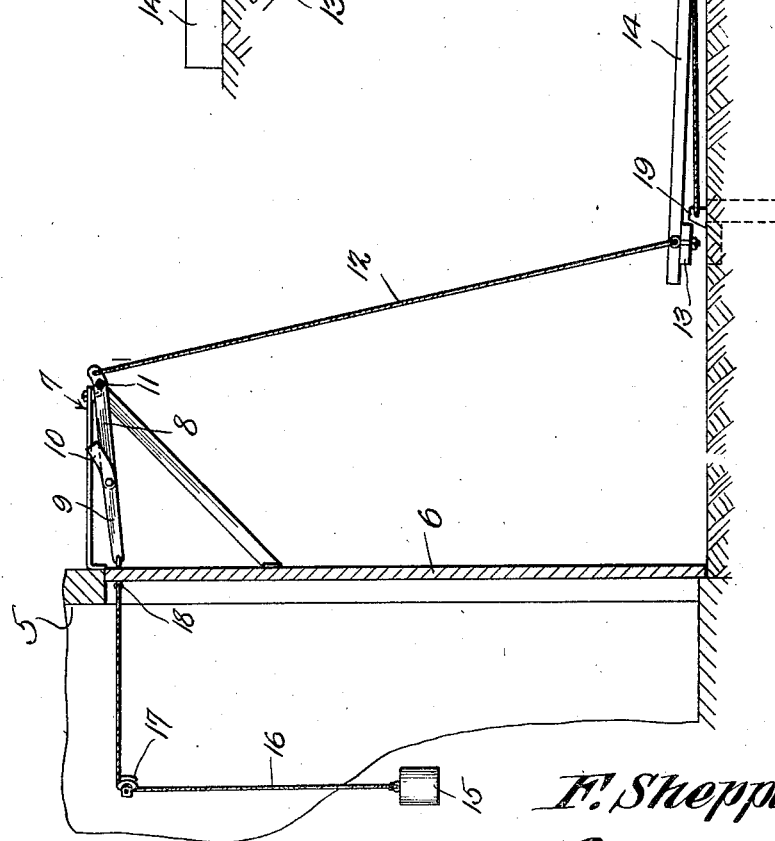
Inventor
F. Sheppard
By C. A. Snow & Co.
Attorneys.

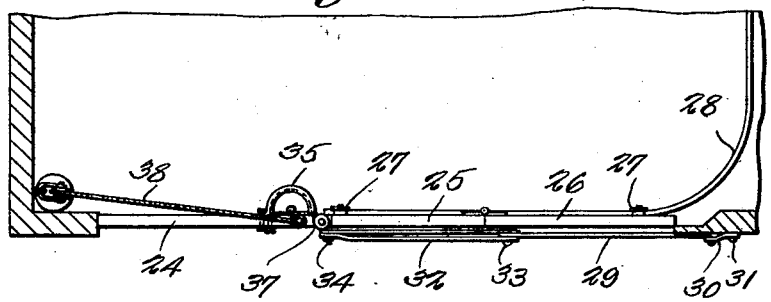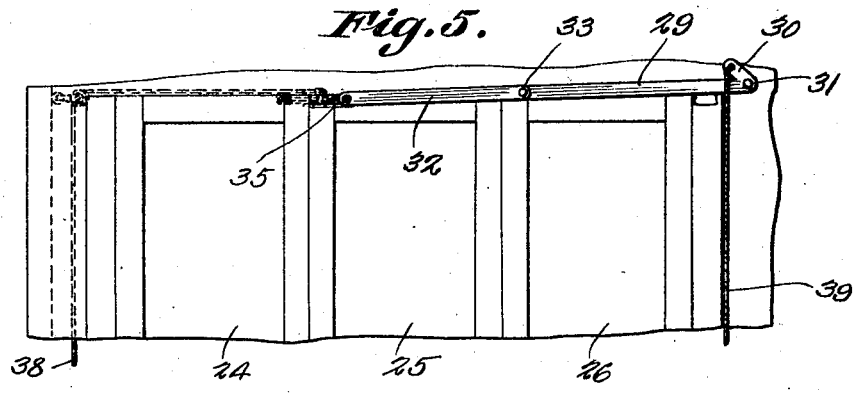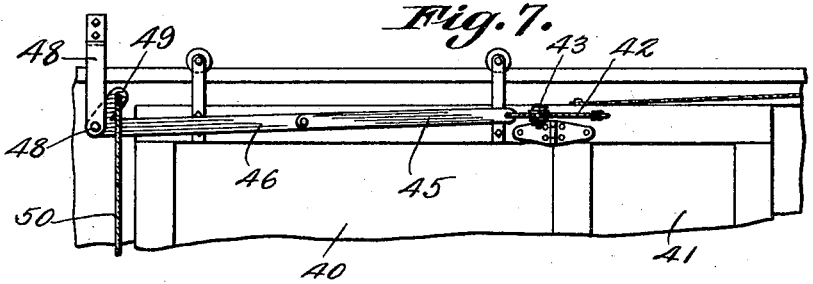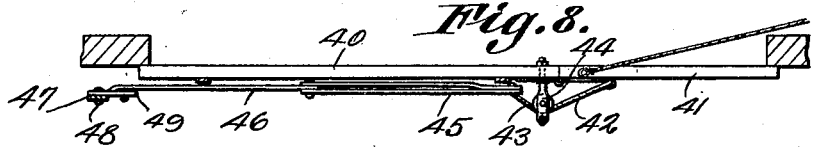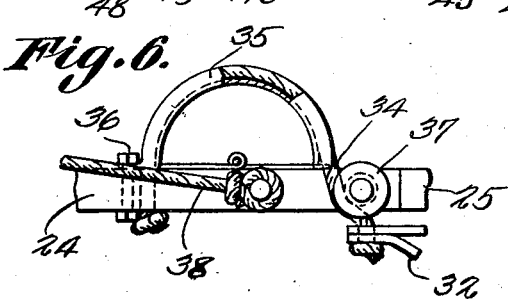

Patented Feb. 28, 1928.

1,660,768

UNITED STATES PATENT OFFICE.

FRANK SHEPPARD, OF CASPER, WYOMING.

GARAGE-DOOR OPENER.

Application filed April 1, 1927. Serial No. 180,237.

This invention has reference to closures, and more particularly closures for garages or the like, the primary object of the invention being to provide an operator connected with the closure and operated by the weight of a motor vehicle moving over a track disposed in front of the closure.

An important object of the invention is to provide an operator of this type including a latch designed to secure the operating mechanism and closures controlled thereby in their active positions to insure against the closure returning to its closed position when a vehicle moves into the garage.

A still further object of the invention is to provide a closure operator of this type which may be readily and easily installed on closures of the usual and well known type eliminating the necessity of making alterations in the closure contruction to install the device.

With the foregoing and other objects in view which appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view illustrating an operator constructed in accordance with the invention as installed.

Figure 2 is an elevational view thereof, a closure being shown in section.

Figure 3 is an enlarged sectional view partly in elevation, illustrating the latch mechanism forming a part of the operator.

Figure 4 is a plan view of an operator of a modified structure.

Figure 5 is an elevational view thereof.

Figure 6 is an enlarged detail view illustrating a bracket employed as a part of the operating device when used in connection with combined folding and sliding doors.

Figure 7 is an elevational view of an operating mechanism employed in connection with a sliding door or closure.

Figure 8 is a plan view thereof.

Referring to the drawings in detail, the reference character 5 designates a garage, and the reference character 6 indicates hinged closures. Secured to the building structure adjacent to the upper ends of the closures, are brackets 7, which extend forwardly appreciable distances as clearly shown by Figure 1.

These brackets afford supports for the operating mechanism, which in this form of the invention, embodies a main bar 8 and a bar 9 pivotally connected, the bar 9 being in the form of a length of metal bent intermediate its ends to provide spaced legs between which the bar 8 operates, and as shown, the inner end of the bar 9 is curved slightly upwardly as at 10 so that when the bars are moved in alignment, they will be held in alignment by the contact of the bar 9 with bar 8.

It is to be understood that these brackets are supported at points adjacent to the upper end of each door, and that an operating mechanism such as described is supported by each bracket member. As illustrated by Figure 2, the bar 8 of each operating mechanism, is pivotally connected to its bracket by means of the bolt 11, the free ends of the bars 8 extending beyond the bolts where they have connection with the flexible members 12, the lower ends of the flexible members 12 being connected to the cross bar 13, at the ends of the cross bar, the cross bar being in turn connected with the members 14 forming the runway, with the result that as the members 14 are moved downwardly under the weight of a motor vehicle passing thereover, the flexible members 12 will move downwardly operating the bars 8 and 9 to move the closures or doors to their open positions.

In order that the closures will be returned to their closed positions, weights 15 are provided and hang from the inner ends of the flexible members 16, the flexible members operating over pulleys 17 as clearly shown by Figure 2.

These flexible members 16 have connection with the closures, at 18. In order that the closures will be held in their open positions when a machine has moved over the runway to open the closures, a latch member 19 is provided, the same being urged normally forwardly by means of the spring 20 so that the head 21 of the latch member will move to a position over one edge of the cross bar 13 to hold the bar to the limit of its downward movement.

The members 14 have their forward ends pivotally supported so that the ends of the members 14 nearest to the garage will normally lie in spaced relation with the ground surface so that they may move downwardly under the weight of a motor vehicle passing thereover.

Pivotally supported by one of the members 14 and arranged in the path of travel of a vehicle passing thereover, is a pivoted member 22 to which the flexible member 23 is connected, the flexible member being also connected with the latch 19 to move the latch 19 against the action of the spring to release the cross bar and allow the members 14 and closures to return to their initial positions.

In the form of the invention as illustrated by Figures 4 and 5, a closure operating mechanism is provided for operating a combined folding and sliding closure, the closure embodying hingedly connected sections 24, 25 and 26, the same being provided with rollers 27 that operate on the curved track 28 in the usual and well known manner.

This operating mechanism includes a main lever 29 having an upwardly and inwardly extended portion 30 disposed adjacent to the pivot 31 that connects the lever 29 to the building structure, the forward end of lever 29 being connected with the lever 32 at 33.

The forward end of lever 32 connects with the flexible member 34 that moves over the curved guide 35 that in turn has connection with the closure section 24, at 36, the opposite end of the guide 35 passing through a notch formed in the upper portion of the adjacent closure section 25, when the flexible member 34 is pulled by the member 32.

In order that the closure operator may operate freely, the flexible member 34 moves over the pulley 37 mounted on the closure section 25. In this form of the invention, a flexible member 38 is connected with the closure section 25, the opposite end of the flexible member supporting a weight to return the closures to their closed positions.

Connected with the upwardly and inwardly extended portion 30 is a flexible member 39 that connects with the cross bar 13, in the event that the operating device is to be used in connection with folding and sliding closures of this type.

Figures 7 and 8 illustrate an operating mechanism employed in connection with direct sliding closures, and in these figures, the reference character 40 indicates a closure to which the hinged closure 41 is secured, to which hinged closure 41 is secured a flexible member 42 which operates over the pulley 43 supported in the bracket 44, the other end of the flexible member 42 being connected with the arm 45 of the operating mechanism. This arm 45 connects with the lever 46 pivotally supported on the bracket 47 at 48. Member 46 also has an upwardly and inwardly disposed end portion 49 to which the the flexible member 50 is connected, which flexible member 50 connects with the cross bar 13 of the runway.

From the foregoing it will be seen that due to this construction, a person may drive onto the members 14, the weight of the vehicle passing thereover being sufficient to operate the pivoted lever of the operating mechanism to move the closures to their open positions. When it is desired to close the closures, after the vehicle has passed into the garage, the latch member may be released by merely kicking or moving the member 23 rearwardly.

As soon as the latch member is moved to its inactive position, the weights described will operate to move the closures to their closed positions.

It might be further stated that by making a slight change in the construction of the levers and brackets for supporting the levers, the device may be used in connection with garage doors constructed to swing inwardly and embodying two or more sections hingedly connected.

I claim:—

1. In a closure operator, a vertically movable runway, a closure embodying a plurality of hingedly connected sections, rollers operating on a track and connected with the closure for supporting the closure, pivotally connected members supported adjacent to the upper end of the closure, a curved bracket member extending inwardly from one of the sections of the closure, a flexible member positioned over the bracket and connected with the pivotally connected members, means for connecting the pivotally connected members and runway to operate the pivotally connected members, and said pivotally connected members adapted to exert a pull on the flexible member and bracket member to fold the sections of the closure and move the closure over its supporting track.

2. In a closure operator, a vertically movable runway, a closure embodying a plurality of hingedly connected sections, a track for supporting the closure and over which the closure moves, pairs of pivotally connected members having connection with the closure, means for connecting the runway and pivotally connected members to fold the sections of the closure one upon the other, and to simultaneously slide the closure over the track.

In testimony that I claim the foregoing as my own, I have hereto affixed my signature.

FRANK SHEPPARD.